United States Patent [19]
Dunlap

[11] 3,866,865
[45] Feb. 18, 1975

[54] SYSTEM FOR SUPPORTING AND ALIGNING DRIVE MOTORS

[75] Inventor: Jerald V. Dunlap, Pacific Palisades, Calif.

[73] Assignee: Intercompressor, Inc., Santa Monica, Calif.

[22] Filed: Mar. 11, 1974

[21] Appl. No.: 449,964

Related U.S. Application Data
[62] Division of Ser. No. 245,319, April 19, 1972, abandoned.

[52] U.S. Cl. ........................ 248/2, 308/29, 417/359
[51] Int. Cl. .... F16c 35/00, F04b 17/02, F16p 15/06
[58] Field of Search ................... 248/2, 14; 417/359; 308/29, 32

[56] References Cited
UNITED STATES PATENTS

| | | | |
|---|---|---|---|
| 1,992,500 | 2/1935 | Morgan | 417/359 |
| 2,832,905 | 4/1958 | Clay | 308/32 X |
| 3,264,941 | 8/1966 | Miraglia | 264/261 |
| 3,540,314 | 11/1970 | Howard | 264/261 |
| 3,614,039 | 10/1971 | Norberg | 248/2 |

*Primary Examiner*—J. Franklin Foss
*Attorney, Agent, or Firm*—Miketta, Glenny, Poms & Smith; Professional Corporation

[57] ABSTRACT

A drive shaft of a motor is precisely held in coaxial alignment with the bearing of a driven device and while the motor is so held it is bonded to the driven device in such a way as not to effect the precision alignment thereby assuring an aligned, supported and permanently mounted shaft in the driven device.

4 Claims, 2 Drawing Figures

SYSTEM FOR SUPPORTING AND ALIGNING DRIVE MOTORS

This is a division of application Ser. No. 245,319, filed Apr. 19, 1972 now abandoned.

This invention relates generally to assembly operations and more particularly to a novel system for supporting and aligning a driving shaft to a coupling in a driven device such as a motor shaft with a pump.

BACKGROUND OF THE INVENTION

Many manufactured products constitute a combination of a driving motor and a driven device. For example, small air compressors usually include a driving motor coupled to the compressor. The compressor manufacturer often buys a "general purpose motor" from a motor manufacturer, for reasons of economy, rather than build the motor himself. Such "general purpose motors" typically do not have bearings capable of high radial loads, do not have indexing or alignment end plates and have only the simplest mounting means (usually two bolt studs). This is usually the least expensive design. Further, for the same reasons, the manufacturer often attempts to use the driving shaft of the motor also as the driven shaft in the compressor, thereby saving the shaft coupling and alignments required between the two shafts. However, these economies introduce three engineering problems not reliably or inexpensively solved heretofore:

a. The radial loading on the shaft by the compressor often exceeds the capability of the bearings in the "general purpose motor." To provide a capable bearing in the compressor introduces the classic "three bearings in a row" alignment problem, i.e., it is exceedingly difficult to get the two bearings in the motor plus the bearing in the compressor in perfect axial alignment.

b. To provide proper alignment of the motor shaft with the mating and working parts of the compressor, the motor must have an additional alignment end plate which is perpendicular and concentric with the shaft and that interlocking mates with a similar perpendicular and concentric surface on the compressor. Such additional structure is often expensive to provide. It must be emphasized that proper alignment is critical to successful operation of a compressor. For example, if the diametrical clearance between the shaft and each of say, three bearings in a row were 0.001 inch, (which is typical), displacing any one bearing radially one half of 0.001 inch will cause the shaft to bind on that bearing. If the bearing were moved a further one half of 0.001 inch, the friction caused by this misalignment would impair the performance of the compressor and cause wear to the shaft and bearings.

c. The compressor body must be rigidly attached to the motor body to maintain the above alignment, prevent vibration between the compressor and the motor, and further, allow the radial loading on the shaft to be more evenly distributed over all the shaft bearings. However, rigid attachments involve force level fasteners (e.g. nuts and bolts) which can easily distort the alignment when tightened.

If a "general purpose motor" is used in the manufacture of a compressor, with the motor shaft also used as the compressor shaft, a simple, dependable, inexpensive means to align and radially support the motor shaft and rigidly fasten the motor to the compressor is needed. It is to be pointed out that pumps, generators, etc., will equally be benefited from such a means.

BRIEF DESCRIPTION OF THE PRESENT INVENTION

With the foregoing in mind, the present invention contemplates a novel method and assembly wherein first and second elements respectively supported in first and second housings such as a shaft and a coupling are supported and maintained in exact alignment in a permanent manner by introducing a viscous material in an intervening space between the housings and permitting it to harden.

More particularly in a preferred embodiment, the method contemplates the steps of providing projections rigidly extending from the housing for one of the elements such as a motor shaft and projection receiving bores larger in cross-sectional area than the projections in the other housing which might constitute a driven device supporting a bearing or coupling for the shaft. The first and second housings are assembled together so that the projections are loosely received in the bores, the space between the projections and bores constituting an intervening space. Exact aligning of the elements such as the shaft with the coupling is then effected in the assembly of the components, relative movement between the housings being accomodated by the intervening space or excess area of the bores receiving the projections. The exact alignment is held for a given period of time during which period the projections and bores are treated in a manner to permanently secure them together during this period of time so that the alignment of the elements is maintained.

In the preferred form of the invention, the treating of the projection and bores comprises the introduction of a material in a viscous state into the bores to surround the projections, the material having the property of hardening to a rigid mass within the period of time that exact alignment is maintained. In one actual embodiment of the invention, the material involves an epoxy cement.

BRIEF DESCRIPTION OF THE DRAWINGS

A better understanding of the invention will be had by referring to an example thereof as illustrated in the accompanying drawings, in which.

DETAILED DESCRIPTION OF THE PREFERRED EMBODIMENT

Figure 1:
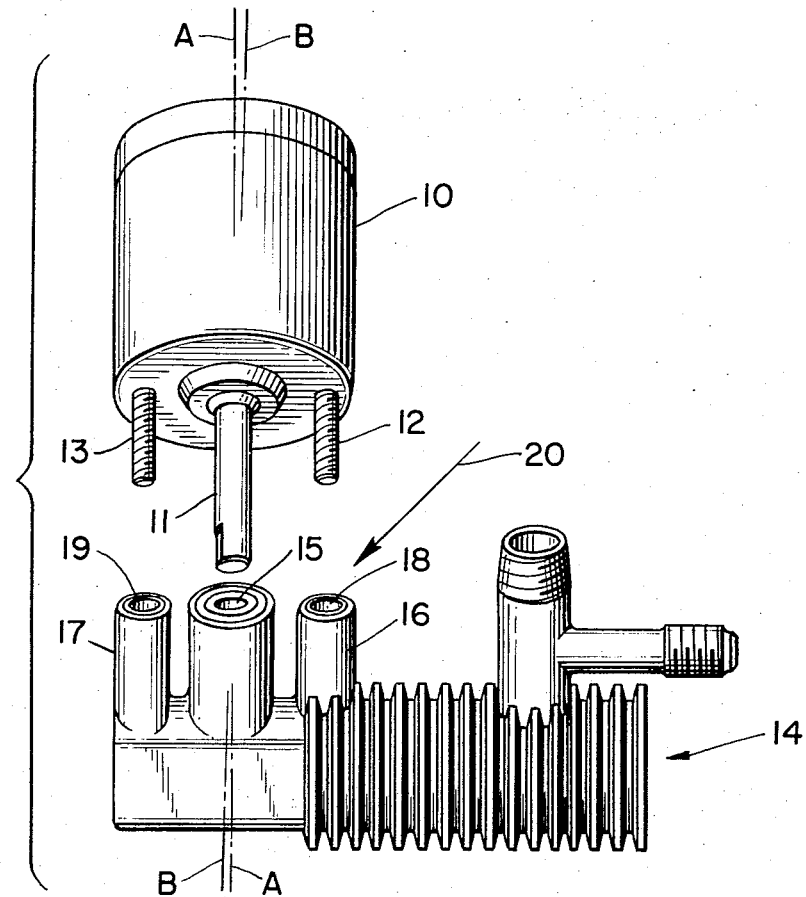
FIG. 1 is a perspective view of a driving motor and a driven device such as a compressor pump in positions preparatory to being assembled together to couple the motor driving shaft with the driven pump coupling; and, FIG. 2 is a fragmentary view partly in cross-section showing the components of FIG. 1 in assembled relationship wherein exact alignment of the motor shaft with the coupling in the driven device is maintained.

Referring to FIG. 1 there is shown a shaft housing 10 supporting a driving shaft 11. The housing 10 may constitute the casing of a conventional electrical motor. At least two projections 12 and 13 are provided on the housing 10 in radially spaced relationship to the axis of the shaft 11. In FIG. 1, this axis is designated A—A. In the particular example chosen for illustrative purposes, the projections 12 and 13 are provided by substituting screws of greater length for the conventional assembly screws utilized in assembling the shaft and motor housing so that the ends of the longer screws project from the front of the housing as shown.

A driven device such as a compressor 14 in turn includes a coupling 15 for cooperation with the shaft 11. The axis of the coupling 15 is indicated at B—B and is illustrated in FIG. 1 as being slightly out of coaxial alignment with the axis A—A. It is desirable to mount the housing 10 to the driven device 14 in such a manner that exact coaxial alignment will be maintained between the shaft 11 and the coupling 15.

With the foregoing end in view, there are provided by means of lugs 16 and 17 constituting an integral portion of the driven device 14, projection receiving bores 18 and 19 respectively. These bores are radially spaced from the axis B—B in a manner corresponding to the spacing of the projections 12 and 13 relative to the shaft axis A—A so that when the shaft is received in the coupling, the projections are received respectively in the bores.

In accord with the present invention, the cross-sectional areas of the bores 18 and 19 are purposely made larger than the cross-sectional areas of the projections 12 and 13 so that the projections are loosely received in the bores and slight relative tilting movements between the motor shaft 11 and coupling 15 can take place.

Figure 2:
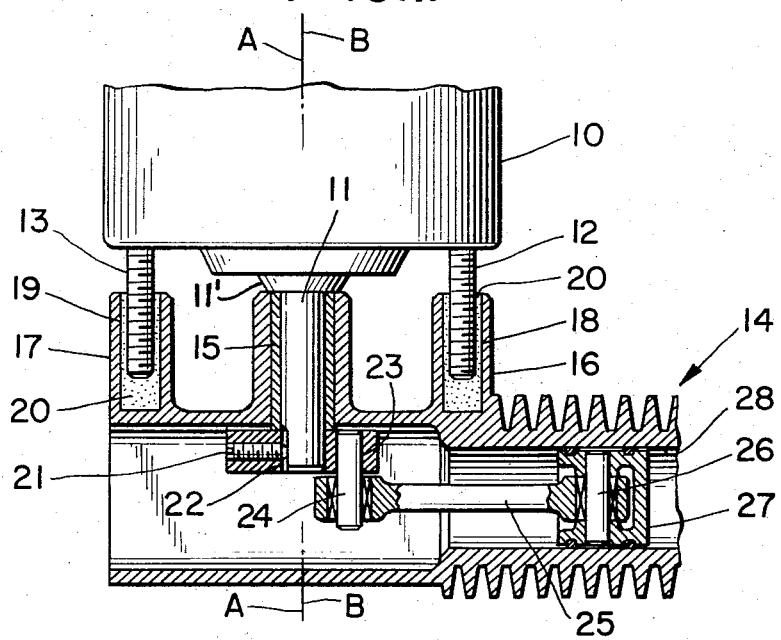

Referring now specifically to FIG. 2, the projections 12 and 13 are shown received in the bores 18 and 19 and the shaft 11 received in the bearing or coupling 15. At this stage of the assembly, exact alignment of the shaft 11 is effected relative to the bearing or coupling 15 in the manufacturing plant. This alignment is accomplished in the example shown by centering the beveled ring bearing 11' surrounding the exit point of the shaft 11 on the bearing 15. Since the center of gravity of the motor 10 is normally located on the axis A—A; that is, since the motor is symmetrical about this axis, gravity will hold the motor in the vertical aligned position shown. The excess area in the bores 18 and 19 will accomodate movements of the axis A—A relative to the axis B—B so that exact alignment can be effected with the projections 12 and 13 still received in the bores 18 and 19. Exact alignment results when the resultant of all forces is coaxial with the axis A—A.

The foregoing exact alignment is held in the assembly plant for a given period of time, during which time, the projections 12 and 13 and bores 18 and 19 are treated in a manner to permanently affix the projections in the bores thereby mounting the motor housing 10 to the driven device 14 and maintaining the exact alignment established.

In the particular example illustrated, the permanent affixing of the projections within the bores is accomplished by introducing a material 20 in viscous form in the bores 18 and 19 at least partially filling these bores prior to reception of the projections 12 and 13. The material introduced into the bores is characterized by the property of hardening into a rigid solid or mass without causing stress as by expansion or contraction within the period of time that the axes are maintained in exact alignment. For example, the material 20 may constitute an epoxy cement. FIG. 1 illustrates by the arrow the introduction of this cement 20 into the bores 18 and 19.

Once the epoxy cement has set, the motor housing 10 is then permanently secured in absolutely rigid relationship relative to the driven device 14 so that the shaft 11 will be maintained in exact alignment within the bearing or coupling 15.

As shown in FIG. 2, the coupling as stated is associated with an air compressor and may include a suitable drive wheel crank or 21 coupled to the end of the shaft 11 at 22 and including an eccentric journal 23 for cooperation with a coupling 24. The coupling 24 is disposed at the end of a piston rod 25 in turn coupled at 26 to a piston 27. Reciprocation of the piston 27 within a cylinder 28 will thus result upon rotation of the drive wheel 21 which in turn is driven by the motor shaft 11.

In the foregoing specific arrangement, the two projections 12 and 13 are disposed on diametrically opposite sides of the shaft 11 and are generally in alignment with the motion of the piston 27. The permanent securement of the projections in the receiving bores provides a very rigid mounting for the motor housing relative to loads directed in alignment with motion of the piston which is the direction in which maximum loads would result. However, in other applications it should be understood that more than two projections could be utilized with a corresponding number of cooperating receiving bores. For example, three such projections could be provided circumferentially spaced at 120° about the shaft 11 and a corresponding number of receiving bores would be similarly positioned relative to the coupling 15. Alternatively, it is possible to secure the motor housing to the coupling housing by simply filling the intervening space between the housings with a viscous material.

OPERATION

The method of assembly and resulting assembly itself will be evident from the foregoing description. As mentioned earlier, it is conventional practice to secure a motor housing to a driven device by simply screwing a flange on the motor housing to a mating flange or other structure on the driven device. However, unless the threading down of the screws is precisely carried out with exactly the same amount of force, slight tilting of the motor shaft axis can occur which would result in a slight binding of the shaft in the coupling.

The present invention obviates the foregoing problems by utilizing the method and structure as described. Thus, in its most economic and simple form, the conventional housing screws holding the housing and motor shaft assembly together may be removed and longer screws substituted therefor to provide extending ends defining the projections 12 and 13 of FIG. 1. Thereafter, the projection receiving bores 18 and 19 may be at least partially filled with the epoxy cement in liquid form. The motor shaft 11 and projections 12 and 13 are then received respectively in the coupling 15 and bores 18 and 19, the epoxy cement filling the annular space surrounding the projections within the receiving bores. The axis A—A is then held in exact alignment with the axis B—B for the period of time necessary for the cement to cure or harden into a rigid mass. Thereafter, the motor housing 10 is rigidly mounted relative to the pump housing 14 and the axis of the shaft 11 is permanently maintained in proper alignment with the axis of the coupling 15.

From the foregoing, it will thus be evident that the present invention has provided a very simple, economical and accurate means of supporting and aligning drive motors with driven devices in the manufacture and assembly of products incorporating these basic components. As a consequence, substantial economy is realized since the "general purpose" type less expensive motors can be used in lieu of more expensive motors and the necessary accompanying structure to assure and maintain alignment is not necessary.

What is claimed is:

1. In a driving motor having a housing and a rotatable driving shaft supported in said housing coupled to a driven device having a housing including a bearing for receiving said shaft, means for supporting said driving motor housing to said driven device housing and maintaining alignment of said shaft in said bearing for rotation about a common axis of the shaft and bearing, comprising:
   a. at least two projections rigidly secured to and extending from one of said housings in radially spaced relationship to said common axis;
   b. means in said other housing defining at least two projection receiving bores of greater cross-sectional area than said projections and radially spaced from said axis at positions receiving said projections when said shaft and bearing are in substantial alignment; and
   c. means rigidly securing said projections in said bores after an exact alignment of said shaft with said bearing has been effected so that said exact alignment is maintained permanently.

2. The subject matter of claim 1, in which said securing means comprises a material initially received in said bores in a viscous state and characterized by setting into a rigid solid after a given period of time.

3. The invention as defined in claim 1 wherein the shaft is subjected during rotation to leftward and rightward reciprocating forces along a given direction substantially perpendicular to the common axis of the shaft and bearing, at least one of said projections being disposed leftwardly of said common axis and at least one projection being disposed rightwardly thereof.

4. The invention as defined in claim 1 wherein said projections include two projections on diametrically opposite sides of the common axis along the given direction.

* * * * *